Nov. 6, 1934. H. L. HOWE 1,979,267
METHOD AND APPARATUS FOR TESTING BITUMINOUS AND OTHER MIXTURES
Filed Nov. 16, 1929
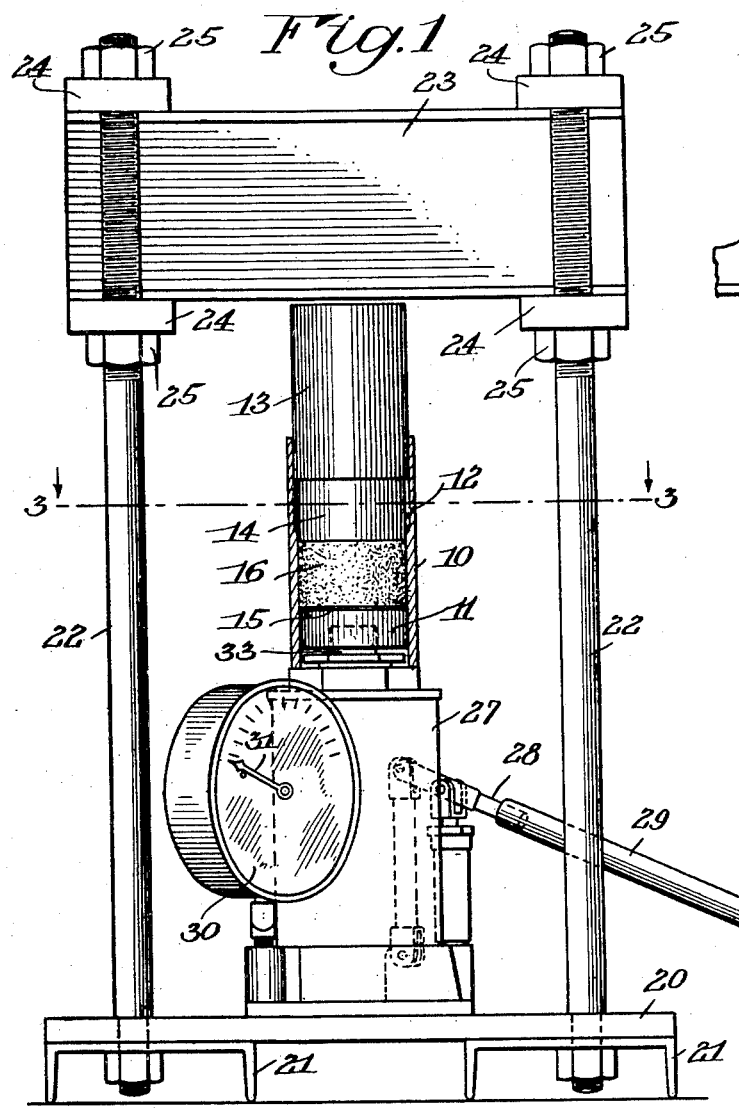
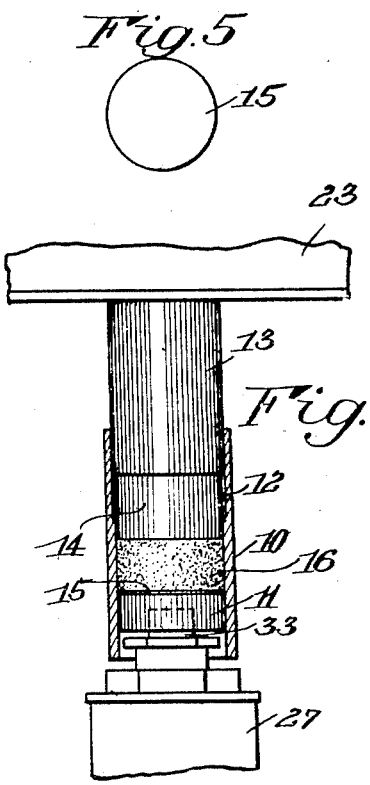
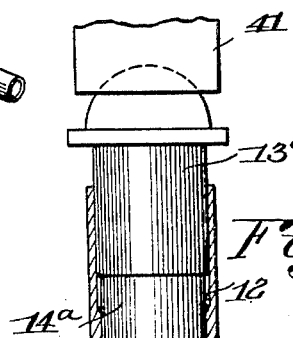
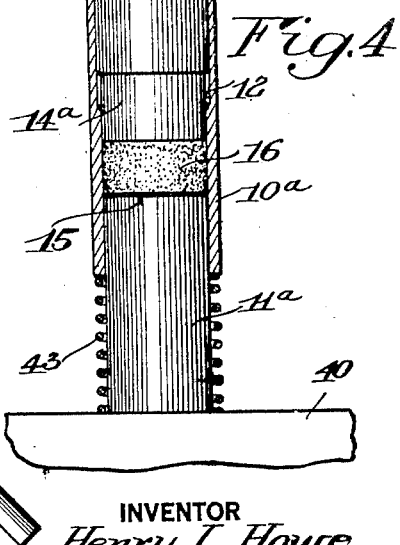
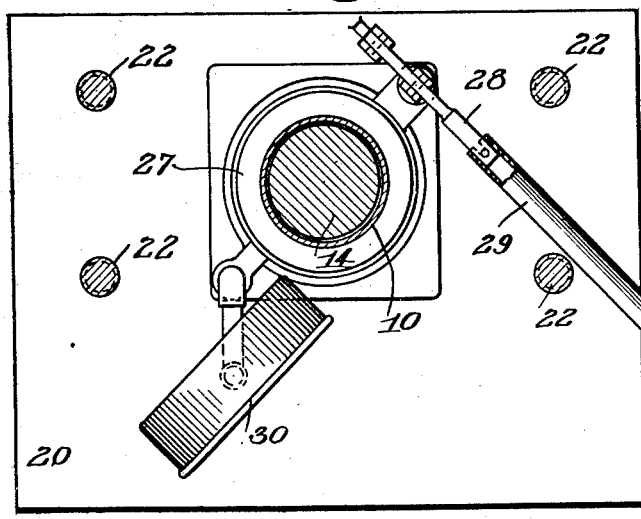
INVENTOR
Henry L. Howe
BY
Cumpston & Griffith
his ATTORNEYS Patented Nov. 6, 1934

1,979,267

UNITED STATES PATENT OFFICE 1,979,267

METHOD AND APPARATUS FOR TESTING BITUMINOUS AND OTHER MIXTURES

Henry L. Howe, Rochester, N. Y.

Application November 16, 1929, Serial No. 407,768

11 Claims. (Cl. 73—51)

This invention relates to a method of testing bituminous and other mixtures, and to apparatus for carrying out the method in a simple and satisfactory manner. An object of the invention is to provide an improved method of testing various mixtures which is more sensitive and accurate than the methods heretofore known, and yet which is exceedingly simple and comparatively easy to use.

The method is particularly adapted to the testing of bituminous mixtures, such for example as those for use in street pavements, but the method is not limited to use in connection with bituminous mixtures, and it is an object of the invention to provide a method of testing which may be used advantageously for testing other mixtures also. The method of the present invention may be employed in general for testing any mixture comprising an aggregate and a binder which is ductile or plastic at the temperature at which the test is conducted. For example, the method might be used for testing coal briquettes comprising coal dust aggregate and pitch or molasses as a binder, or for testing mixtures of sand aggregate and clay binder for use as a surfacing for sand-clay or clay-sand roads.

Another object is the provision of a method of testing substances in which the substance after being tested according to the novel method is suitable for further or other uses.

A further object is the provision of simple, compact and efficient apparatus for carrying out the novel method.

To these and other ends the invention resides in certain improvements and combinations of parts, all as will be hereinafter more fully described, the novel features being pointed out in the claims at the end of the specification.

In the drawing:

Fig. 1 is an elevation, with parts in vertical section, of a preferred embodiment of apparatus for carrying out the novel method;

Fig. 2 is a fragmentary view of parts of the apparatus shown in Fig. 1 in a slightly different position;

Fig. 3 is a horizontal section taken substantially on the line 3—3 of Fig. 1;

Fig. 4 is a fragmentary view partly in elevation and partly in vertical section of a modified form of apparatus for carrying out the novel method, and Fig. 5 is a plan of a disk of sheet material used in connection with the method and apparatus, Similar reference numerals throughout the several views indicate the same parts.

The method and apparatus of the present invention deal, as above set forth, with the testing of various materials or mixtures, and are applicable in general to any mixture containing a binding material which is plastic or ductile at the temperature used in the test. For convenience of description, the method and apparatus will be described below partly in connection with the testing of bituminous mixtures, it being clearly understood that bituminous mixtures are mentioned only by way of example.

The test of the present invention may be used for bituminous materials whether they are intended for use in street pavements or for any other uses. The word bitumen as used throughout this specification and in the claims is intended in its broadest sense, and includes asphalt, tar and other substances.

The usual method heretofore commonly used for testing bitumen in mixtures intended for street paving, for example, has been the so-called pat test. According to this method, a sample of the mixture to be tested is placed upon a sheet of kraft paper or similar material, the paper is folded over the mixture, and the resulting body of bituminous mixture between the two layers of paper is hit several times by a brick or club held in the hand of the person making the test. This causes the bitumen in the bituminous mixture to discolor or stain the paper in contact with the mixture, and this discolored paper is observed as an indication of the amount of bitumen present in the bituminous mixture being tested.

The pat test is exceedingly crude and unsatisfactory, however, since the resulting stain on the paper is a function not only of the amount of bitumen present but also of the temperature of the mixture, of the impact force of each blow, and of the number of blows. Ordinarily, no particular attention is paid to the temperature of the mixture. Obviously it is impossible, when blows are struck by hand, to standardize the blows except in a very crude or general way. Even two successive blows may vary considerably from each other in impact, notwithstanding that great care may be taken to make them of the same intensity. It is practically impossible, moreover, to make the blows struck at one time in one test substantially uniform with the blows struck at another time in conducting another test. Accordingly the resulting pat prints of two tests may be quite different although the samples being tested are substantially the same, or the resulting prints may be of substantially the same appearance when the samples being tested have considerably different bitumen contents.

Not only is the prior pat test quite crude, as above pointed out, but it also is far from sensitive, as it often does not indicate variations of considerable magnitude in the relative amounts of bituminous binder present in the mixtures tested.

It is partly to overcome the crudeness and lack of sensitivity of the previous methods of testing that the present invention has been developed. This invention provides a test which can be accurately controlled and standardized so that two tests made even at widely different times or in widely separated places will nevertheless furnish accurate comparisons of the content of bitumen or other binder in the mixtures being tested. Furthermore, the novel test in accordance with the present invention is extremely sensitive, clearly showing relatively small variations in the amount of binder present in the mixture. This novel test is easy to carry out, and requires only simple apparatus.

According to a preferred embodiment of the invention, the method of testing comprises subjecting a mixture containing a binder, at a predetermined temperature, to a controllable pressure of predetermined magnitude against another material, and observing the stain produced on this other material by the binder in the mixture. The material against which the mixture is pressed is preferably a sheet material and may be a sheet of paper, a piece of wood, or any other material capable of being stained or discolored by the binder. Kraft paper forms a convenient material for this purpose.

In carrying out this novel method, it is preferred not only to subject the material being tested to a pressure of predetermined magnitude at a predetermined temperature, but also to maintain it under such pressure for a predetermined length of time. For example, the mixture may be pressed against the material (such as kraft paper) with a pressure of three thousand pounds per square inch, and this pressure may be maintained for a period of twelve minutes, after which the pressure may be released and the stain produced on the material may be observed as an indication of the excess or deficiency of the binder in the mixture. The stained piece of material may be called a "compression stain print."

Since controllable pressures and temperatures of predetermined magnitude are utilized in the present novel method, such pressures and temperatures may be readily reproduced at different places or different times, so that various samples of material can be tested under the same standardized conditions, with the result that various tests may be properly correlated with each other.

It is to be noted that the utilized pressure of predetermined magnitude is preferably a predetermined pressure per unit of area. If a testing pressure of three thousand pounds per square inch, for example, is decided upon, then a sample of material which has a cross sectional area of two square inches would be placed under a total pressure of six thousand pounds when conducting a test, and a sample having a cross sectional area of three square inches would be placed under a total pressure of nine thousand pounds.

When placed under pressure in conducting a test, a bituminous mixture continues to compress or shrink in size slowly even when the pressure is not increasing, and other mixtures of aggregates and binders may compress similarly. This is usually due to the flow of the binder, under pressure, into the voids of the aggregate and to contraction due to cooling. When pressure is applied as by means of a testing machine or hydraulic jack, for example, the slight shrinkage in volume under compression results in a release of pressure unless the operation of the testing machine or jack is continued to some extent. The novel method of testing contemplates that the sample being tested shall preferably be held under substantially constant pressure for a predetermined length of time. Accordingly, after the pressure has first been applied to the sample in the amount of, say, three thousand pounds per square inch, the operation of the pressure applying means is continued from time to time as may be necessary in order to maintain the pressure substantially constant notwithstanding the slight shrinkage in volume of the sample, for a period of twelve minutes for example.

In carrying out this method of testing, it is often found advantageous to heat the sample of material being tested. Preferably in testing bituminous mixtures, the mixture is heated to a temperature of between 300° and 325° Fahrenheit immediately prior to the test, so that it is still substantially at this temperature when the pressure is applied. It is also advantageous to heat the container in which the mixture is placed while being compressed, so that the container will not chill the mixture to too great an extent. Where the container comprises a cylinder and plungers, for example, the plungers as well as the cylinder are preferably heated. The heating of the container may conveniently be accomplished by placing it in boiling water for a sufficient length of time so that the container reaches the temperature of the water, and it is then quickly dried just before using it.

Slightly better and more uniform results are obtained if the mixture being tested is somewhat compacted by tamping so as to level it off before the pressure is applied. Preferably the mixture, either previously heated as in the case of bituminous mixtures, or at room temperature as in the case of sand-clay mixtures, is placed in a container which is preferably previously heated for use with bituminous mixtures or at room temperature for use with certain other kinds of mixtures. The mixture is then levelled off and somewhat compacted as by tamping it a predetermined number of times with a tamping implement. For example, a steel rod of one-half inch diameter and ten inches long may be employed as a standard tamping implement, and the mixture may be tamped, say, fifty times, the first fifteen strokes covering the surface in general, the next twenty-five strokes being applied around the periphery, and the remaining ten strokes over the surface in general, for example. Where heated mixtures are used, the tamping rod is preferably heated in boiling water and dried just before use.

The pressure is then applied, preferably to the extent of three thousand pounds per square inch in the case of bituminous mixtures, or to any other desired magnitude in the case of other kinds of mixtures, and the operation of the pressure applying means is continued as may be necessary in order to hold the pressure substantially constant at the predetermined magnitude for a predetermined length of time, which may be twelve minutes, for example, in the case of bituminous mixtures. The compressed material is then removed from the container in which it was compressed, and the sheet of kraft paper or other material used to obtain a stain print is examined. The appearance of this "compression stain print" indicates to an experienced observer the relative amount of binder present in the mixture, showing whether this amount is equal to or more than or less than the "optimum" amount, which is the most desirable amount to use.

The "optimum" amount of binder is the best amount to use under any given circumstances. It is generally that amount which will just fill the voids of the aggregate in a bituminous street paving mixture, but may be more than or less than this amount in other mixtures, depending upon the use to which the mixture is to be put and the characteristics desired. The use of less than the "optimum" amount of binder may result in an unsatisfactory mixture for the purpose desired. The use of more than the "optimum" amount may be wasteful of binder and may also result in a mixture which is less satisfactory for the intended purpose than one in which the "optimum" amount is used. The "optimum" amount of binder varies in accordance with the character of the aggregate and the grading thereof, as well as the use to which the mixture is to be put, and the characteristics desired.

A "compression stain print" made in accordance with the present invention will clearly indicate to an experienced observer whether or not the "optimum" amount of binder has been used in the mixture being tested. When less than the "optimum" amount is used, there will be relatively little binder squeezed out of the mixture when it is compressed during the test, and the stain print will be stained relatively faintly. When an excess of binder is used, a relatively large amount will be squeezed out under compression, and the stain print will be very heavily stained. When the "optimum" amount of binder is present in a mixture to be used in a bituminous paving mixture, for example, the stain print will ordinarily be strongly stained. Thus the degree of discoloration or stain on the stain print is proportionate to the relative amount of binder present, and an experienced observer quickly learns to judge by eye from the stain print whether there is an excess or deficiency of binder, and approximately the amount of such excess or deficiency.

Some binders, such as asphaltic cement used as a binder in a bituminous mixture, will discolor the stain print material sufficiently to make satisfactory stain prints without any special treatment of the binder. In other cases, as for example certain kinds of clay used as binders in sand-clay mixtures, the clay may not discolor the stain print sufficiently to make a satisfactory print, and it may be desirable to mix a dye with the clay or other binder prior to the test, so that a satisfactory and easily readable stain print will be formed. Or in some cases, it may be preferred to use a sensitized paper for making the compression stain print, the paper being sensitized to be affected by any desired ingredient or ingredients in the mixture being tested.

Although a time of twelve minutes for holding the pressure on the mixture has been mentioned above, it will be understood that this time may be varied as desired. In actual practice, it is found that when the pressure on a bituminous mixture is continued for twelve minutes, with the mixture and the container heated as stated above, the mixture will then have reached substantially its maximum compression under the conditions of test. Accordingly, twelve minutes is a suitable time to use as the standard time for holding pressure in conducting tests on bituminous mixtures, other suitable times being adopted as may be preferred for testing other mixtures.

Wherever pressures, temperatures, or times have been mentioned above, it is to be understood that they have been stated only by way of example, and that other predetermined pressures, temperatures, or times may be substituted if preferred, either for any one test or for all tests. The various pressures, temperatures, and times given as examples above have been found during the course of numerous experiments and tests to be extremely satisfactory as standards in actual use when testing bituminous paving mixtures, and it is preferred at present to adopt them as the standard constants in conducting tests on such mixtures. In particular, pressures of about three thousand pounds per square inch have been found to be more satisfactory than pressures materially higher or lower for such mixtures. But when testing mixtures of other kinds, the pressures, temperatures, and times might be varied greatly from the examples given above, in order to obtain the best results for the particular kind of mixture being tested, depending upon the use to which it is to be put or the characteristics desired.

The present invention further comprises simple and efficient apparatus for carrying out the above described novel method. This apparatus comprises, in general, a suitable container in which the mixture to be tested may be compressed to the desired extent in contact with a sheet of kraft paper or other material used to obtain a stain print, and suitable means for applying pressure to compress the mixture within the container. Preferably the container is provided with two plungers each movable relative to the body of the container, thus greatly reducing the effect of friction of the sample being tested against the walls of the container body, in order to make the resulting compressed mixture of as near uniform density as possible. Preferably also the container has arrangements for the rapid and easy removal of the compressed sample therefrom.

Referring now to the drawing, Figs. 1 and 4 each illustrate a container constructed in accordance with this invention, the two containers differing slightly from each other in respects which will be pointed out below. Each container comprises a cylinder, designated by the numeral 10 in Figs. 1 and 2 and by the numeral 10a in the modification shown in Fig. 4. This cylinder is open at both ends, and arranged to receive two plungers each movable relatively to the cylinder.

The lower plunger, designated by the numeral 11 in Figs. 1 and 2 and by the numeral 11a in Fig. 4, is a plain plunger of the proper diameter to slide easily within the cylinder. Near the upper end of the cylinder there is a portion 12 of enlarged diameter for use especially in removing the compressed material from the cylinder, as will be explained below. The shoulder at the junction between the cylinder portion of larger diameter and the portion of smaller diameter is preferably inclined or beveled so that material or the plunger will not lodge thereon. The upper plunger has a portion designated by the numerals 13 and 13a which is of larger diameter to fit slidingly within the cylinder portion of larger diameter, and another portion, designated by the numeral 14 and 14a, of smaller diameter to fit slidingly within the cylinder portion of smaller diameter. The plunger portion of larger diameter fitting in the cylinder portion of larger diameter serves to guide the plunger accurately in the cylinder and to prevent relative tilting or wobbling thereof.

When using this apparatus, a disk 15 of kraft paper or other suitable material is placed upon the lower plunger, the mixture to be tested 16 is then placed within the cylinder on top of the paper 15, the upper plunger is inserted, and pressure is applied to force the two plungers toward each other, thus compressing the mixture between them and in contact with the sheet material 15 so as to form a compression stain print upon the latter, all as set forth above in the description of the novel method.

Various convenient arrangements may be employed for applying the necessary pressure to the plungers. Figs. 1, 2, and 3 illustrate a form of apparatus which is small, compact, and relatively light, so that it may be carried around from place to place for use wherever testing is to be done. This embodiment comprises a base plate 20 resting upon channels 21, and upright posts 22 extending through and suitably secured to the base plate and channels by screw threads, nuts, or other suitable means.

Near the upper ends of the posts 22, an I-beam 23 extends across the apparatus, being clamped between and supported by cross bars 24 which are held in place by nuts 25 screwed on the posts 22. The I-beam 23 forms an abutment for the upper plunger 13.

A jack 27, preferably of the hydraulic type, rests removably upon the base plate 20. This jack has an operating lever 28 to which a removable extension handle 29 may be applied when it is desired to operate the jack. The jack is also provided with a gauge 30 showing the total force or pressure applied by the jack plunger at any given time. The gauge preferably is of sensitive but sturdy construction so that it will register accurately, and preferably it is of such size and capacity that when the jack has been operated to produce the desired standard pressure upon the plungers, the gauge hand 31 will stand about midway of the graduations on the gauge, since it is found that most gauges are somewhat more sensitive and accurate at pressures near the middle of their graduations than near either end of the graduations.

The jack plunger 33 fits within a socket formed on the under side of the lower cylinder plunger 11, and all parts of the jack plunger which rise above the top of the jack during operation are of smaller diameter than the diameter of the cylinder 10, so that they do not directly contact with the cylinder.

In operation, when it is desired to make a test, the jack 27 is slid forwardly to the front part of the base plate 20, which projects some distance in front of the posts 22, as will be seen from Fig. 3, the extension handle 29 first being removed so that it does not contact with a post 22 to prevent such sliding of the jack. When the mixture to be tested is one which it is preferred to heat and to test in a heated container, the cylinder 10 and the two plungers 11 and 13 are placed in boiling water until they attain the temperature of the water, and meanwhile the mixture to be tested is heated to a predetermined temperature of, say, between 300° and 325° F. The cylinder and plungers are removed from the boiling water and quickly dried, the lower plunger is placed in position on top of the jack plunger 33, and the cylinder 10 is put in position around the plunger 11 and resting loosely upon the top of the jack 27.

A disk 15 of kraft paper or the like, cut to the proper shape to fit within the cylinder 10, is placed upon the lower plunger 11, and the heated mixture to be tested is then dumped into the cylinder on top of the disk 15. The mixture 16 is then preferably compacted, as by means of tamping it with a standard tamping rod of steel, one-half inch in diameter, and ten inches long, for example, which has previously been heated in boiling water and quickly dried. The tamping may be done in any desired manner, but preferably a standard tamping procedure is adopted and used for all tests so that there will be no substantial variations in tamping which might cause variations in the result of the test. One satisfactory tamping procedure, as mentioned above in the description of the method, is to tamp fifty times with the standard steel tamping rod above described, the first fifteen strokes covering the surface of the mixture in general, the next twenty-five strokes being applied around the periphery, and the remaining ten strokes over the surface in general.

After the mixture has been tamped and thereby roughly levelled, the upper plunger 13 is inserted in the cylinder. The jack 27, together with the cylinder and plungers now supported on the jack, is slid rearwardly on the base 20 until the upper plunger 13 is in a central position beneath the I-beam 23, the extension handle 29 then being placed upon the operating lever 28. At this time, the parts are substantially in the position shown in Fig. 1 of the drawing.

Operation of the jack is then commenced by oscillating the handle 29 up and down, which causes the jack plunger 35 to rise and to carry with it the lower cylinder plunger 11. After the upper cylinder plunger 13 has been raised through the clearance distance and comes into contact with the I-beam 23, further upward movement of the upper plunger is prevented, and continued movement of the lower plunger results in compressing the mixture 16 between the two plungers. Meanwhile the operator observes the gauge 30, and stops the operation of the jack when the gauge shows that the pressure has reached the desired standard amount. It is to be noted that the gauge is so placed that the operator may watch it continuously while he is operating the handle 29.

The standard pressure for use with bituminous mixtures is preferably 3000 pounds per square inch, as stated above. Assuming that such a mixture is being tested, if the cylinder has a cross sectional area of three square inches, for example, a total pressure of 9000 pounds should be applied by the jack. Accordingly, the operator stops operation of the handle 29 when the hand 31 of the gauge 30 reaches 9000 pounds, but he continues to observe the gauge and to operate the jack from time to time as may be necessary in order to hold this pressure at the predetermined amount for a predetermined length of time of, say, 12 minutes. As has been explained above, the mixture 16 continues to shrink slightly in volume under compression even when the pressure is not increasing, so that it is necessary to operate the jack slightly from time to time during the holding period in order to maintain the pressure at the desired standard amount.

When the mixture compresses during the application of pressure thereto, all the particles thereof except those at the extreme upper surface of the mass obviously move upwardly, since the upper plunger 13 is stationary and the lower plunger 11 is moving upwardly toward it. Of course the particles near the lower part of the mass 16 move upwardly farther and faster than the particles near the upper part thereof. The upward movement of the particles of the mixture obviously tends to raise the cylinder 10 on account of the friction between the upwardly moving peripheral particles and the cylinder wall. Since the cylinder 10 at the beginning of the test simply rested loosely upon the top of the jack 27, and since it is not fixed to either of the plungers, it follows that this cylinder is free to move upwardly in response to the tendency caused by the upwardly moving particles of the mixture. The cylinder may therefore be said to be "floating", since it is not fixed relative to either plunger but is permitted to move longitudinally relative to both plungers in response to the movements of the mass of material being tested.

The weight of the cylinder 10 is practically negligible in comparison to the high pressures used and to the frictional forces resulting therefrom. Hence the cylinder will move through a distance substantially equal to the average movement of all the peripheral particles of the mass 16 in contact with the cylinder, which means that ordinarily the cylinder will rise somewhat more than the distance which the upper plunger 13 rises before it comes into contact with the I-beam 23 and somewhat less than the distance which the lower plunger 11 rises.

Fig. 2 of the drawing illustrates the parts at this stage of the test, clearly showing, when compared with Fig. 1, that the mixture 16 has compressed and that the cylinder 10 has risen somewhat from its initial position.

Experiments have been conducted with a cylinder having only one plunger movable relative to the cylinder, and it is found that the compressed mass of material formed in such a cylinder has a substantially different density at one end than that at the other end, the difference in density being due to the friction between the material and the cylinder walls. When using a double plunger cylinder, however, the densities at the two ends of the resulting compressed mass of material are substantially equal, since the dragging effect of friction between the cylinder walls and the material is practically eliminated by mounting the cylinder floatingly so that it may move relative to both plungers. Although a single plunger cylinder may be used for testing in accordance with the novel method of this invention, the double plunger cylinder gives much more satisfactory results and it is preferred to use such a cylinder. Also, it is preferred to use a cylinder of substantially circular cross section, although cylinders of other shapes, polygonal or otherwise, could be employed if desired.

The length of the holding period, or time during which the pressure is held substantially constant on the sample, may be varied at will, but preferably this holding period is made sufficiently long so that the mixture reaches the maximum compression or density obtainable at the particular pressure and temperature used. Such a state of maximum density is indicated when the pressure shown on the gauge 30 remains constant for a minute or so without operation of the jack. In practice, it is found that a holding period of twelve minutes is sufficient to compress bituminous mixtures to a compression or density which simulates that obtained in actual street pavements, and it is accordingly preferred to adopt twelve minutes as the standard holding period when bituminous mixtures of street paving materials are being tested.

At the termination of the holding period, the jack plunger is lowered to release the pressure, the extension handle 29 is removed, and the jack is slid forwardly on the base 20 until the plunger 13 is clear of the I-beam 23 so that this plunger may be lifted vertically out of the cylinder 10. The jack is then slid rearwardly again until it is beneath the I-beam 23, the extension handle 29 is applied, and the jack is operated to raise the jack plunger 33 and the lower cylinder plunger 11. Due to the friction between the compressed sample 16 and the cylinder 10, the cylinder is raised along with the lower plunger 11 until the top of the cylinder comes into contact with the I-beam 23 or with a block which may be positioned between the top of the cylinder and the bottom of the I-beam.

When the upward motion of the cylinder is stopped, by contact with the I-beam or the block, continued operation of the jack continues to move the lower plunger 11 upwardly, forcing the compressed plug 16 upwardly through the cylinder 10. This compressed plug is tightly wedged in the cylinder portion of smaller diameter in which it was formed, but the jack forces it out of this portion of the cylinder and into the upper portion 12 of larger diameter, where the plug 16 is loose and free.

As soon as the plug 16 has been freed by forcing it wholly into the cylinder portion 12 of larger diameter, the jack may be lowered and slid forwardly on its base so that the cylinder 10 and lower plunger 11 may be removed therefrom, and the cylinder 10 may be inverted so that the plug 16 drops out of the cylinder portion 12. The disk 15 of kraft paper or the like will usually be found to adhere to the end of the plug 16 with which it was in contact, but it may easily be stripped off of the plug for examination.

An experienced observer is able to tell from the appearance of the disk 15 after it is stripped off of the plug 16 the relative proportion of binder present in the sample tested, and whether this amount of binder is equal to, or more than, or less than the "optimum" amount which should be used for the particular aggregate present in the sample being tested, all as set forth above in the description of the method. Usually the face of the disk 15 which was in contact with the plug 16 is the one observed, but when the binder content is excessively high, then this face of the disk is often entirely discolored and the result of the test is determined by observing the opposite side of the disk, which was in contact with the lower plunger 11, this lower face of the disk being somewhat discolored by binder which seeps through the disk from the upper face thereof.

After the compression stain print 15 has been stripped off of the compressed plug 16, this plug may be used for further tests or for other purposes. For example, a gasolene drip test for durability or a ball penetration test for stability may be made on the plug. The plug may also be used for determining the density and voids in the compressed mixture. When the plug consists of a sand-clay mixture, a sloughing test may be made on it by hanging it in water for a predetermined time. When it consists of a bituminous mixture such as aggregate and asphaltic cement of the character used in asphalt street pavements, then the plug may be used to fill a hole made in a street pavement by a paving sampling set. The possibility of using the resulting plug in other ways is an important feature of the present invention. Heretofore, the product produced in making similar tests according to previously known methods or apparatus has been in general a waste product, not capable of any further efficient use. Obviously the apparatus herein disclosed may be utilized to make compressed plugs of material for the above mentioned or any other purposes, even when it is not desired to make a compression stain print test of the material. When the cylinder 10 and plungers 11 and 13 have been cleaned, the apparatus is then ready for a test of another sample of material, which test may be carried out in the same manner above described.

In laboratories equipped with a universal testing machine or with any similar mechanism capable of exerting and holding a predetermined amount of pressure, it is often convenient to utilize such a machine instead of the hand operated hydraulic jack illustrated in Fig. 1. Fig. 4 of the drawing shows testing apparatus arranged for use with a universal testing machine having a weighing table 40 and a head 41 movable downwardly toward the weighing table.

The lower plunger 11a used in this instance rests upon the weighing table 40 and may be similar to the plunger 11 used with the hand operated jack, but is preferably somewhat longer as shown in Fig. 4. The cylinder 10a may be similar to the cylinder 10, and has an upper portion 12 of larger diameter, while the upper plunger has a portion 13a of larger diameter fitting in and guided by the cylinder portion 12 and another portion 14a fitting in the lower cylinder portion of smaller diameter.

In this apparatus, the cylinder 10a should not rest directly upon the weighing table 40, since this would prevent it from moving downwardly relative to the lower plunger 11a when the mixture is compressed, and would make the device in effect a single plunger cylinder, open to the disadvantages previously pointed out. It is desirable that the cylinder 10a be supported floatingly so that it is free to move in response to the movements of the particles of the sample being tested. For this purpose, a light coiled spring 43 is placed over the plunger 11a before the cylinder is put in position, and the cylinder rests upon this spring as shown in Fig. 4. The spring is preferably just strong enough to support the weight of the cylinder in the desired position, being sufficiently weak so that the friction of the downwardly moving particles of the sample upon the walls of the cylinder 10a will be able to move the cylinder downwardly without substantial resistance from the spring 43.

Obviously other forms of floating mounting for the cylinder 10a might be employed.

The apparatus illustrated in Fig. 4 may be used in the manner similar to that illustrated in Figs. 1 and 3. The cylinders and plungers are preferably heated as before, the disk 15 of kraft paper or the like is placed in the cylinder upon the bottom plunger, the heated mixture is placed in the cylinder and compacted, and the upper plunger 13a is put in position. The testing machine is then operated to cause the head 41 thereof to move downwardly toward the weighing table 40, thus forcing the upper plunger 13a down toward the lower plunger 11a and compressing the sample 16 between the two plungers. As the sample compresses, the cylinder 10a moves downwardly slightly, under the influence of the friction between it and the downwardly moving particles of the sample.

The pressure is applied to the desired extent, say, 3000 pounds per square inch, the total pressure being indicated by the usual scale beam connected to the weighing table 40, and after the pressure reaches the desired amount, the operation of the machine is continued briefly from time to time in order to maintain the pressure substantially constant. At the end of the holding period, the head 41 is elevated, the plunger 13a is removed, and the head is again lowered to press downwardly upon the cylinder 10a until the compressed plug 16 is forced out of the cylinder portion of smaller diameter and into the cylinder portion 12 of larger diameter, thus freeing the plug from the cylinder so that it may drop out of the cylinder when the latter is inverted.

Although the disk 15 on which the compression stain print is formed is preferably placed on the bottom plunger of the apparatus, and beneath the mixture, it obviously may be placed on top of the mixture or between two layers of the mixture or in various other positions if preferred. The bottom plunger provides a smooth bearing surface for the disk, however, and it is ordinarily preferred to place it there.

It will be seen from the foregoing description that a satisfactory method of testing mixtures has been developed, applicable to the testing of practically any mixture of an aggregate and a binder, and that simple apparatus for carrying out this method has been disclosed. Since controllable and measurable pressures and temperatures are used, and since various factors which might affect the results of tests are carefully standardized, it follows that the tests are sensitive and accurate and that the compression stain prints resulting from tests will vary in accordance with the relative amounts of binder in the samples tested.

While certain embodiments of the invention have been described, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. The method of testing mixtures which comprises subjecting a mixture containing a binder to pressure of predetermined magnitude against another material for a predetermined length of time, and observing the stain produced upon the material by the binder in the mixture.

2. The method of testing mixtures which comprises subjecting a confined quantity of a mixture containing a binder to predetermined substantially constant pressure for a predetermined length of time in contact with another material, and observing the stain produced upon the material by the binder.

3. The method of testing mixtures which comprises subjecting a mixture containing a binder to predetermined substantially constant pressure for a predetermined length of time in contact with sheet material, and observing the stain produced upon the sheet material by the binder.

4. The method of testing mixtures which comprises subjecting a mixture containing a binder to predetermined substantially constant pressure per unit of area for a predetermined length of time in contact with sheet material, and observing the stain produced upon the sheet material by the binder.

5. The method of testing mixtures which comprises subjecting an artificially heated mixture containing a binder to predetermined substantially constant pressure per unit of area for a predetermined length of time in contact with sheet material, and observing the stain produced upon the sheet material by the binder in said mixture.

6. The method of testing mixtures which comprises heating a container, heating a mixture containing a binder, placing the hot mixture in the hot container in contact with sheet material, subjecting the mixture to predetermined substantially constant pressure for a predetermined length of time, and observing the stain produced upon said sheet material by the binder in said mixture.

7. The method of testing mixtures which comprises heating a container, heating a mixture containing a binder, placing the hot mixture in the hot container in contact with sheet material, compacting the mixture within the container, subjecting the mixture to predetermined substantially constant pressure for a predetermined length of time, and observing the stain produced upon said sheet material by the binder in said mixture.

8. Apparatus for testing mixtures comprising a cylinder for holding a mixture, a pair of plungers fitting within said cylinder and each movable relatively to said cylinder, means for forcing said plungers toward each other to compress the mixture between them, and mechanism for indicating the pressure produced by said means.

9. Apparatus for testing mixtures comprising a cylinder for holding a mixture, a pair of plungers fitting within said cylinder, means for forcing said plungers toward each other to compress the mixture between them, said cylinder being floatingly mounted for movement relative to each of said plungers, and mechanism for indicating the pressure produced by said means.

10. Apparatus for testing mixtures comprising a cylinder for holding a mixture, said cylinder having a portion of larger diameter and a portion of smaller diameter, a plunger extending through the portion of larger diameter and into the portion of smaller diameter, a second plunger extending into the portion of smaller diameter, and means for moving one of said plungers toward the other to compress the mixture between them within the cylinder, the first plunger being removable from the cylinder so that relative movement between the cylinder and the second plunger may move the compressed mixture from the portion of smaller diameter into the portion of larger diameter.

11. Apparatus for testing mixtures comprising a cylinder for holding a mixture, said cylinder having a portion of larger diameter and a portion of smaller diameter, a plunger having a portion fitting in said cylinder portion of smaller diameter and another portion extending through said cylinder portion of larger diameter, said last named plunger portion contacting with and being guided by said cylinder portion of larger diameter, a second plunger extending into said cylinder portion of smaller diameter, and means for moving one of said plungers toward the other to compress the mixture between them within the cylinder portion of smaller diameter, the first named plunger being removable from said cylinder so that relative movement between said cylinder and said second plunger may move the compressed mixture from the cylinder portion of smaller diameter into the cylinder portion of larger diameter, to enable the compressed mixture to be removed readily from the cylinder.

HENRY L. HOWE.